(12) United States Patent
Kyojima

(10) Patent No.: US 9,100,518 B2
(45) Date of Patent: Aug. 4, 2015

(54) INFORMATION PROCESSING APPARATUS, INFORMATION PROCESSING METHOD, AND COMPUTER-READABLE MEDIUM

(71) Applicant: FUJI XEROX CO., LTD., Minato-ku, Tokyo (JP)

(72) Inventor: Masaki Kyojima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/902,235

(22) Filed: May 24, 2013

(65) Prior Publication Data

US 2014/0153061 A1 Jun. 5, 2014

(30) Foreign Application Priority Data

Dec. 3, 2012 (JP) ................. 2012-264488

(51) Int. Cl.
G06K 15/00 (2006.01)
H04N 1/40 (2006.01)
H04N 1/04 (2006.01)
G06K 7/00 (2006.01)
H04N 1/00 (2006.01)

(52) U.S. Cl.
CPC ....... *H04N 1/00328* (2013.01); *H04N 1/00352* (2013.01)

(58) Field of Classification Search
None
See application file for complete search history.

(56) References Cited

U.S. PATENT DOCUMENTS

| | | | |
|---|---|---|---|
| 5,671,067 A * | 9/1997 | Negishi et al. | 358/403 |
| 5,838,819 A * | 11/1998 | Ruedisueli et al. | 382/187 |
| 6,259,043 B1 * | 7/2001 | Clary et al. | 178/18.01 |
| 8,099,397 B2 * | 1/2012 | Felderman et al. | 707/667 |
| 2003/0106019 A1 * | 6/2003 | Silverbrook et al. | 715/512 |
| 2004/0199862 A1 * | 10/2004 | Kobayashi et al. | 715/500 |
| 2006/0007189 A1 * | 1/2006 | Gaines et al. | 345/179 |
| 2006/0139667 A1 * | 6/2006 | Morimoto et al. | 358/1.9 |
| 2006/0195426 A1 * | 8/2006 | Ishii et al. | 707/3 |
| 2006/0221064 A1 * | 10/2006 | Sawada | 345/173 |
| 2007/0035755 A1 * | 2/2007 | Maki et al. | 358/1.9 |
| 2007/0041051 A1 * | 2/2007 | Tanaka | 358/1.18 |
| 2007/0182981 A1 * | 8/2007 | Aiso | 358/1.14 |
| 2007/0208785 A1 * | 9/2007 | Hayashi et al. | 707/203 |
| 2007/0211288 A1 * | 9/2007 | Uejo et al. | 358/1.16 |
| 2009/0087017 A1 * | 4/2009 | Onishi et al. | 382/100 |
| 2009/0240519 A1 * | 9/2009 | Ichikawa et al. | 705/1 |
| 2009/0268250 A1 * | 10/2009 | Tolomei et al. | 358/1.18 |
| 2010/0202024 A1 * | 8/2010 | Carey | 358/3.28 |
| 2010/0239160 A1 * | 9/2010 | Enomoto et al. | 382/165 |
| 2011/0035656 A1 * | 2/2011 | King et al. | 715/234 |
| 2011/0080607 A1 * | 4/2011 | Ulichney et al. | 358/1.15 |
| 2012/0082388 A1 * | 4/2012 | Enomoto et al. | 382/203 |

(Continued)

FOREIGN PATENT DOCUMENTS

| | | |
|---|---|---|
| JP | 2007-287047 A | 11/2007 |
| JP | 2007-316795 A | 12/2007 |

*Primary Examiner* — Madelein Nguyen
(74) *Attorney, Agent, or Firm* — Sughrue Mion, PLLC

(57) ABSTRACT

An information processing apparatus includes a receiver that receives sheet identification information included in information images printed onto sheets scanned by a scanner, a detector that detects that a scanning operation by the scanner is an operation indicating that a plurality of sheets are a sequential sheet group, and a unifier that, when the detector detects an operation indicating the sequential sheet group, unifies information corresponding to the plurality of sheets that is respectively indicated by the plurality of sheet identification information received by the receiver during the scanning operation.

12 Claims, 13 Drawing Sheets

(56) References Cited

U.S. PATENT DOCUMENTS

| | | | |
|---|---|---|---|
| 2012/0113460 A1* | 5/2012 | Oda | 358/1.15 |
| 2012/0114244 A1* | 5/2012 | Fujiwara | 382/186 |
| 2012/0249131 A1* | 10/2012 | Yamaguchi et al. | 324/244 |
| 2013/0071168 A1* | 3/2013 | Hayashi et al. | 399/394 |
| 2013/0141750 A1* | 6/2013 | Suzuki | 358/1.14 |
| 2014/0042219 A1* | 2/2014 | Morito et al. | 235/375 |
| 2014/0168716 A1* | 6/2014 | King et al. | 358/473 |

\* cited by examiner

| SYNC CODE 2 bit | X-POS. CODE 5 bit | X-POS. CODE 5 bit | X-POS. CODE 5 bit | X-POS. CODE 5 bit |
|---|---|---|---|---|
| Y-POS. CODE 5 bit | ID CODE 5 bit | ID CODE 5 bit | ID CODE 5 bit | ID CODE 5 bit |
| Y-POS. CODE 5 bit | ID CODE 5 bit | ID CODE 5 bit | ID CODE 5 bit | ID CODE 5 bit |
| Y-POS. CODE 5 bit | ID CODE 5 bit | ID CODE 5 bit | ID CODE 5 bit | ID CODE 5 bit |
| Y-POS. CODE 5 bit | ID CODE 5 bit | ID CODE 5 bit | ID CODE 5 bit | ID CODE 5 bit |

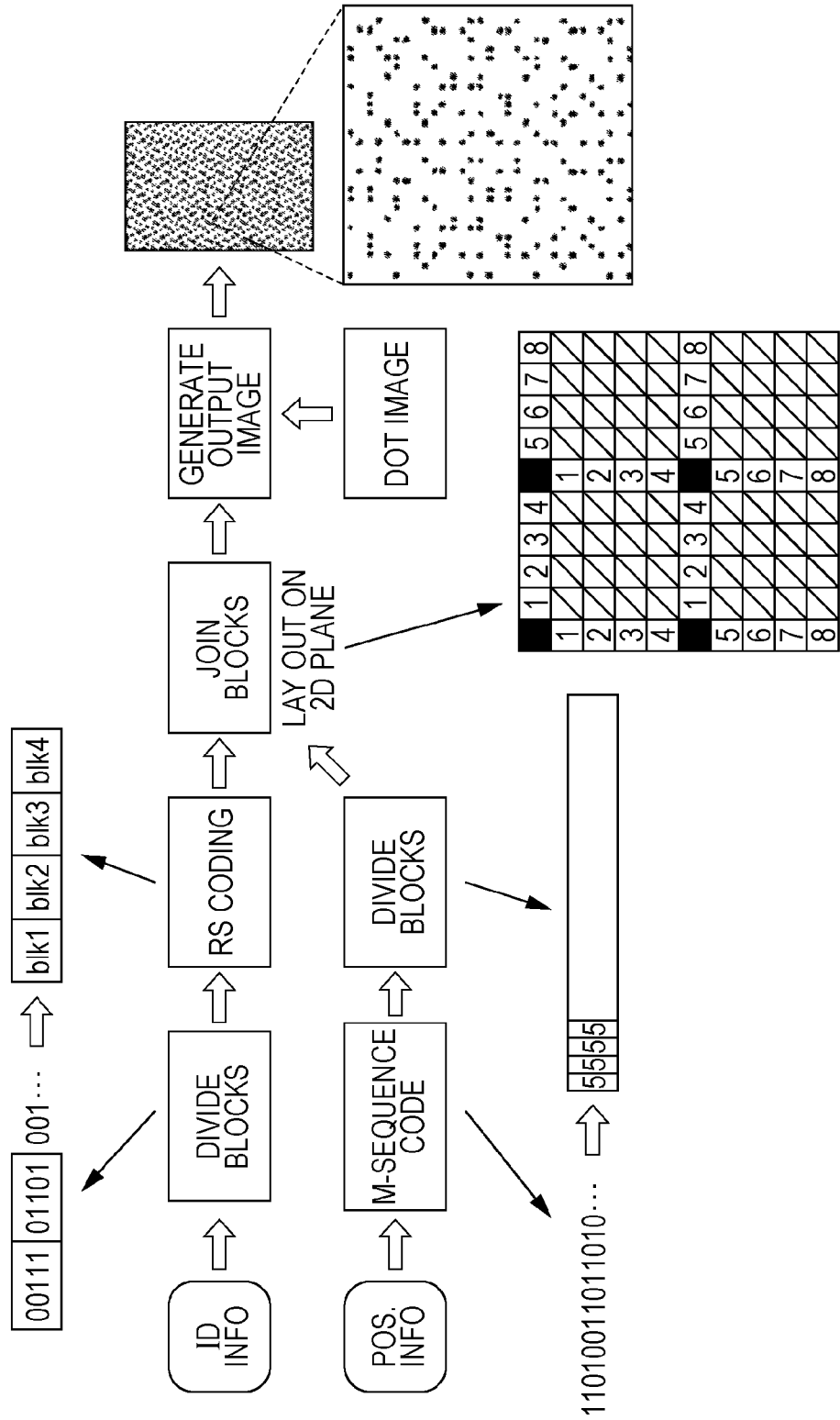

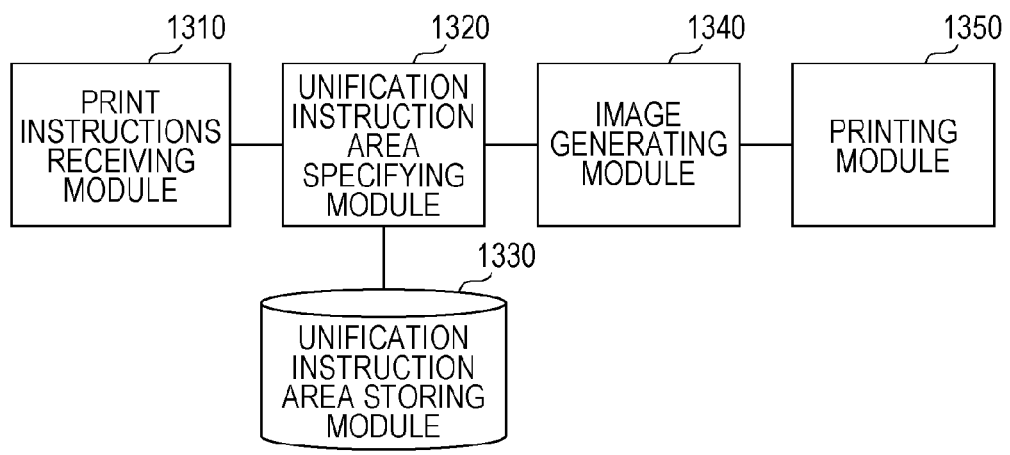

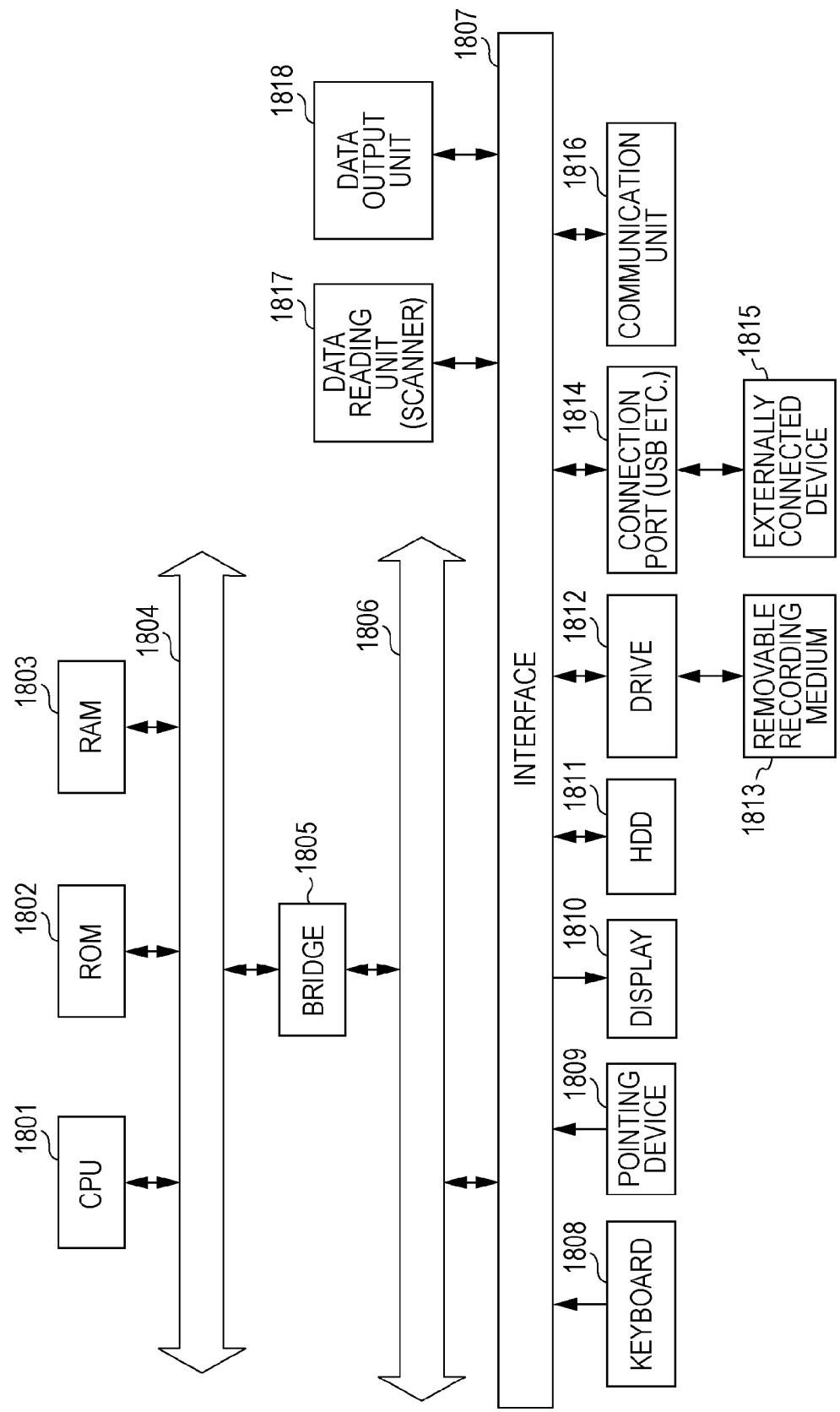

INFORMATION PROCESSING APPARATUS, INFORMATION PROCESSING METHOD, AND COMPUTER-READABLE MEDIUM

CROSS-REFERENCE TO RELATED APPLICATIONS

This application is based on and claims priority under 35 USC 119 from Japanese Patent Application No. 2012-264488 filed Dec. 3, 2012.

BACKGROUND

Technical Field

The present invention relates to an information processing apparatus, an information processing method, and a computer-readable medium.

SUMMARY

According to an aspect of the invention, an information processing apparatus includes a receiver that receives sheet identification information included in information images printed onto sheets scanned by a scanner, a detector that detects that a scanning operation by the scanner is an operation indicating that a plurality of sheets are a sequential sheet group, and a unifier that, when the detector detects an operation indicating the sequential sheet group, unifies information corresponding to the plurality of sheets that is respectively indicated by the plurality of sheet identification information received by the receiver during the scanning operation.

BRIEF DESCRIPTION OF THE DRAWINGS

An exemplary embodiment of the present invention will be described in detail based on the following figures, wherein:

FIG. 8 is an explanatory diagram illustrating an exemplary information encoding process and an exemplary information image (dot code image) generation process in the exemplary embodiment;

FIG. 12 is an explanatory diagram illustrating an exemplary data structure of a unified document table;

FIG. 13 is a schematic module configuration diagram for an exemplary configuration inside a digital paper printing system;

FIG. 14 is an explanatory diagram illustrating an exemplary data structure of a unified instruction area;

FIG. 18 is a block diagram illustrating an exemplary hardware configuration of a computer that realizes the exemplary embodiment.

DETAILED DESCRIPTION

Hereinafter, an exemplary embodiment related to realizing the present invention will be described by way of example on the basis of the drawings.

Figure 1:
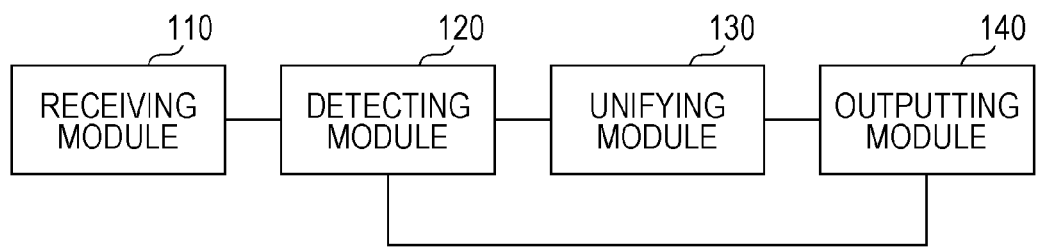
FIG. 1 is a schematic module configuration diagram for an exemplary configuration according to the exemplary embodiment.

FIG. 1 illustrates a schematic module configuration for an exemplary configuration according to the exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage apparatus is made to store information or that control is applied to cause a storage apparatus to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predefined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predefined values", the predefined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "apparatus" not only encompass configurations in which multiple computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include mere, artificially arranged, social constructs (social systems).

Also, every time a process is conducted by each module or every time multiple processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be reduced or omitted in some cases. Note that the storage apparatus herein may include hard disks, random access memory (RAM), an auxiliary or external storage medium, storage apparatus accessed via a communication link, and registers, etc. inside a central processing unit (CPU).

Sheet identification information is information for identifying individual sheets, and is the same as the paper ID (identification) discussed later. Sheet identification information enables a sheet to be uniquely identified by printing an information image representing that sheet identification information onto a sheet.

An information processing apparatus according to the exemplary embodiment is an apparatus that analyzes information images printed onto multiple sheets, and includes a receiving module 110, a detecting module 120, a unifying module 130, and an outputting module 140, as illustrated by example in FIG. 1.

The exemplary embodiment relates to technology that acquires handwritten information in which handwriting has been digitized as a result of writing onto a sheet with a digital pen. With such technology, first, a unique information image (code pattern) is printing onto a sheet at a position on the sheet. Thus, when writing onto the sheet with a digital pen, the information image at the position of the pen tip of the digital pen is scanned and decoded to determine the handwriting position. Handwriting information is then generated from multiple handwriting positions thus determined. A detailed description of a digital pen will be given later using drawings such as FIG. 5.

The receiving module 110 is connected to the detecting module 120, and receives information scanned by a scanner. Specifically, the scanner is the digital pen discussed later, and the scanner scans information images from multiple sheets on which information images have been printed. The information images at least include sheet identification information, which is information that identifies a sheet. Note that the information images in the above "information images [that] at least include sheet identification information" are generated on the basis of sheet identification information. Additionally, sheet identification information may be extracted in the case of scanning and analyzing such information images.

The receiving module 110 may also be configured to additionally receive start information indicating the start of writing by the scanner, and end information indicating the end of the writing. The "start information indicating the start of writing" may be, for example, pen pressure ON information (information indicating that pressure approximately equivalent to handwriting with a digital pen 235 is being exerted).

The "end information indicating the end of writing" may be, for example, pen pressure OFF information (information indicating that pressure approximately equivalent to handwriting with the digital pen 235 is not being exerted, or in other words, information indicating that the digital pen 235 is not in a handwriting state). After all, the receiving module 110 receives pen pressure ON information, multiple sets of sheet identification information and coordinate information, and pen pressure OFF information in a time series. The information between the pen pressure ON information and the pen pressure OFF information constitutes one instance of stroke information (the track written with a single pen stroke).

The receiving module 110 may also be configured to additionally receive time information indicating the time of scanning. For example, it may be configured such that time information is extracted from a clock built into the scanner.

Coordinate information may also be included in an information image, and the receiving module 110 may be configured to additionally receive coordinate information within an information image.

The receiving module 110 may also be configured to additionally receive unreadable information indicating that the scanner was unable to scan. For example, the scanner may output unreadable information in cases such as when reading areas without an information image (such as blank areas, for example).

The detecting module 120 is connected to the receiving module 110, the unifying module 130, and the outputting module 140, and on the basis of information received by the receiving module 110, detects that the scanner has been used to conduct an operation (hereinafter also designated a unifying operation) indicating that the sheets indicated by the sheet identification information in that information are a sequential sheet group. The unifying operation may be an operation such as applying handwriting to multiple sheets with a single stroke, for example.

The detecting module 120 may also be configured to detect that a unifying operation has been conducted in the case where there are multiple, different instances of sheet identification information between the start information and the end information. For example, it may be determined that a unifying operation discussed later using FIG. 10A has been conducted if there are multiple, different instances of sheet identification information in the information between the pen pressure ON information and the pen pressure OFF information (one instance of stroke information) as discussed earlier.

The detecting module 120 may also be configured to detect that a unifying operation has been conducted in the case where there are multiple, different instances of sheet identification information within a predetermined amount of time. As an example of the predetermined amount of time, it may be determined that a unifying operation has been conducted if the time is less than the amount of time between applying the last handwriting to a first sheet, turning the sheet, and applying handwriting to a subsequent second sheet (this amount of time is measured in advance).

The detecting module 120 may also be configured to detect that a unifying operation has been conducted in the case where the coordinate information received by the receiving module 110 is within a predetermined area, and there are multiple, different instances of sheet identification information. The predetermined area may be one of the four corners of a sheet, as discussed later using FIGS. 16 and 17, for example. It is determined that a unifying operation has been conducted if the coordinate information is within the area and there are multiple, different instances of sheet identification information. Note that the conditions of being between start information and end information and also being within a predetermined amount of time may also be added.

The detecting module 120 may also be configured to detect that a unifying operation has been conducted in the case where there is unreadable information between a first instance of sheet identification information and a second instance of sheet identification information. Note that obviously the second instance of sheet identification information is different sheet identification information from the first instance of sheet identification information. Additionally, the conditions of being between start information and end information, being within a predetermined amount of time, and having coordinates within a predetermined area may also be added.

The unifying module 130 is connected to the detecting module 120 and the outputting module 140, and in the case where the detecting module 120 detects a unifying operation, unifies multiple sheet identification information as a sequential sheet group. Herein, unifying refers to treating information corresponding to sheets indicated by multiple instances of sheet identification information as being related to each other. For example, the unifying module 130 may be configured to associate information able to uniquely identify a unified sheet group (unified document ID) with the multiple instances of sheet identification information. Specifically, a unified document table 1200 may be created. Also, new attributes indicating interrelations may be added, and the document data may be stored in a single folder. Furthermore, the unifying module 130 may also combine document data according to need specified by sheet identification information with handwriting information handwritten on the relevant sheets, and treat the multiple data as one set of data.

FIG. 12 is an explanatory diagram illustrating an exemplary data structure of a unified document table 1200. The unified document table 1200 includes a unified document ID field 1210, a number of sheets field 1220, a paper ID(1) field 1230, a paper ID(2) field 1240, and the like. The unified document ID field 1210 stores a unified document ID. The number of sheets field 1220 stores the number of sheets included in that unified document. The number of paper ID(1) fields 1230 is equal to the number of sheets. Fields such as the paper ID(1) field 1230 and the paper ID(2) field 1240 store sheet identification information for a sheet included in that unified document. Note that by storing sheet identification information ordered in the paper ID(1) field 1230 and subsequent fields according to the chronological order in the handwritten information, such information may be treated as the page numbers of the unified document.

The outputting module 140 is connected to the detecting module 120 and the unifying module 130, and outputs a sequential sheet group unified by the unifying module 130. Herein, outputting encompasses behavior such as writing information indicating that there is a sequential sheet group as well as document information for that sequential sheet group to a document storage device such as a document database, storing such information in a storage medium such as a memory card, and passing such information to another information processing apparatus, for example. For example, the outputting module 140 may be configured such that the respective sheets in a single sheet group are each assigned a page number and treated as a single document, and the document data for that sheet group is stored in a single folder. Additionally, the other information processing apparatus may be a survey aggregating apparatus, for example, that aggregates survey results daily by processing multiple survey sheets for every day the survey is conducted. The other information processing apparatus may also be a translating apparatus that performs a translation process on multi-page documents targeted for translation.

Figure 2:
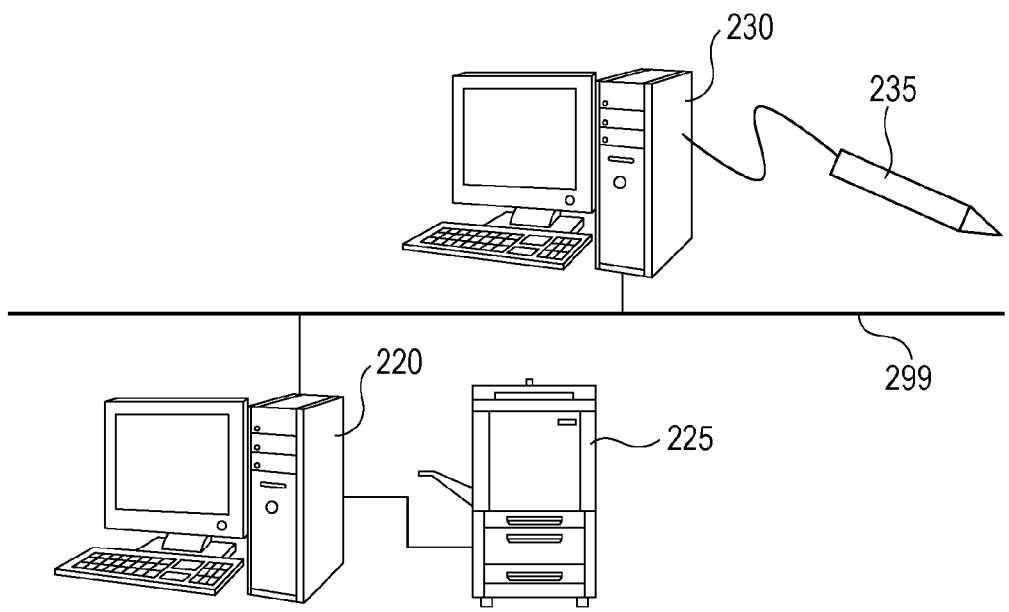
FIG. 2 is an explanatory diagram illustrating an exemplary system in the case of realizing the exemplary embodiment.

FIG. 2 is an explanatory diagram illustrating an exemplary system in the case of realizing the exemplary embodiment.

A digital paper printing system 220 and a handwriting information processing system 230 are connected via a communication link 299 (the link may be wired, wireless, or a combination thereof). A printer 225 is connected to the digital paper printing system 220, and a digital pen 235 is connected to the handwriting information processing system 230. Note that the module configuration illustrated by example in FIG. 1 is mostly formed by the handwriting information processing system 230.

The digital paper printing system 220 uses the printer 225 to print, onto sheets, a document formed by overlaying information images (hereinafter also referred to as dot code images) using paper IDs. In the case where the digital pen 235 is used to apply handwriting to a sheet onto which an information image has been printed by the digital paper printing system 220, the handwriting information processing system 230 overlays that handwriting information onto the document. Additionally, in the case of detecting a unifying operation by an operator operating the digital pen 235, those sheets are unified as a sequential sheet group.

With a digital pen-related process in an information processing system according to the exemplary embodiment, relationships between form images printed onto digital paper or field definitions used when processing handwriting versus paper IDs assigned to sheets are determined when printing a form to create digital paper, and stored in the information processing system. When processing handwriting information written by hand using a digital pen, paper IDs are retrieved from the handwriting information, and the information stored in the information processing system is checked to retrieve form images and field definitions.

Figure 3:
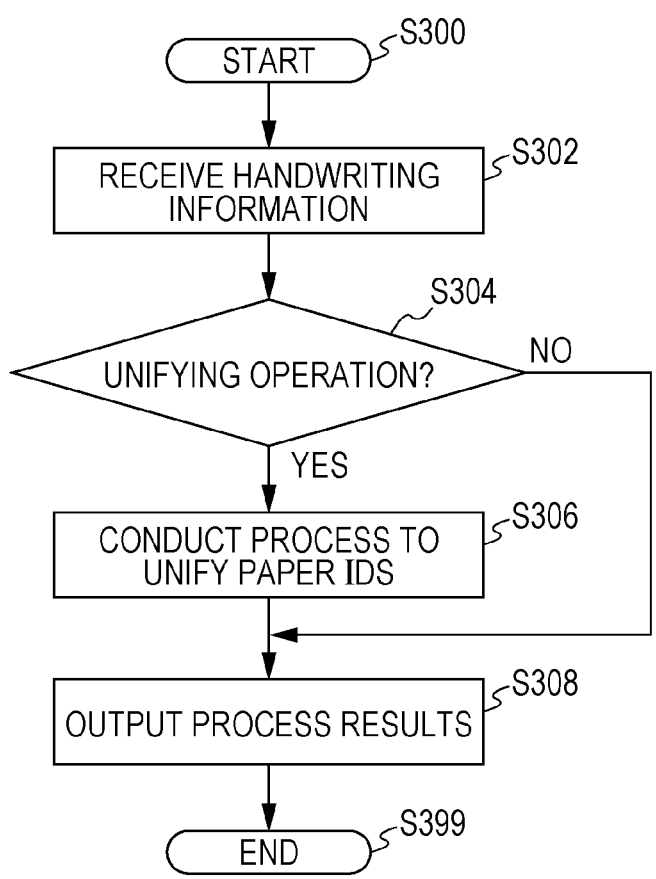
FIG. 3 is a flowchart illustrating an exemplary process according to the exemplary embodiment.

FIG. 3 is a flowchart illustrating an exemplary process according to the exemplary embodiment.

In step S302, the receiving module 110 receives handwriting information from the digital pen 235.

In step S304, the detecting module 120 determines whether or not the handwriting information received by the receiving module 110 is a unifying operation, and proceeds to step S306 if a unifying operation, and otherwise proceeds to step S308.

In step S306, the unifying module 130 conducts a process that unifies the paper IDs included in the handwriting information that expresses a unifying operation.

In step S308, the outputting module 140 outputs the processing results.

Figure 4:
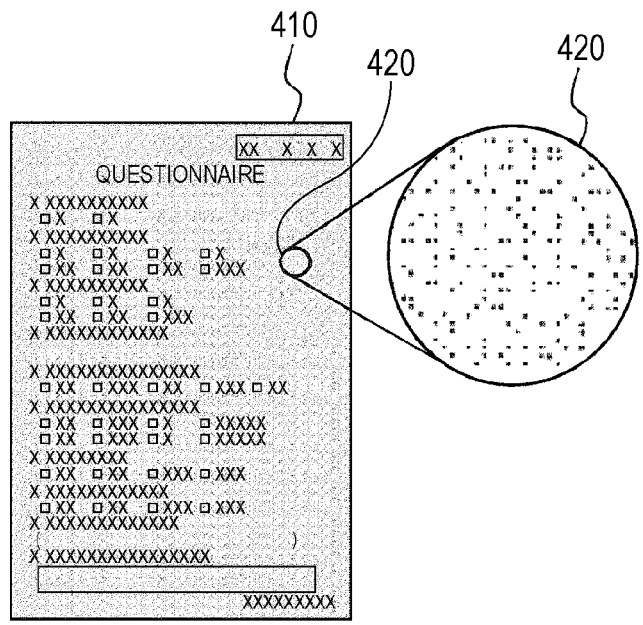
FIG. 4 is an explanatory diagram illustrating an example of digital paper on which an information image is printed.

FIG. 4 is an explanatory diagrams illustrating an example of digital paper 410 on which an information image is printed according to the exemplary embodiment. The digital paper printing system 220 prints the digital paper 410 using the printer 225. A dot code image is printed on the digital paper 410. For example, a dot code image such as that in the enlarged view of the area 420 in FIG. 4 is printed in the area 420 on the digital paper 410. The dot code image expresses the paper ID assigned to individual sheets of the digital paper 410, and on-sheet position information (X and Y coordinate values).

The paper ID is a numerical value in a 32-bit space, for example. In the case of a string notation, the paper ID is expressed as a hexadecimal string. Thus, the paper ID range is from "00000000" to "FFFFFFFF".

Figure 5:
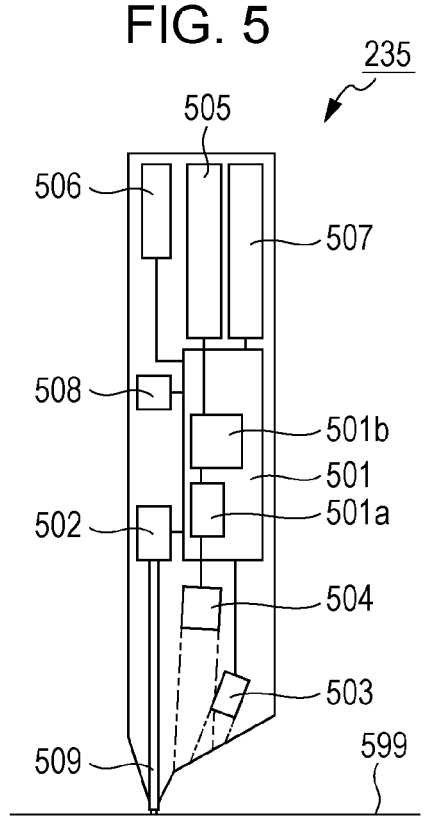
FIG. 5 is an explanatory diagram illustrating an exemplary configuration inside a digital pen.

FIG. 5 is an explanatory diagram illustrating an exemplary configuration inside the digital pen 235.

First, a summary will be given. When applying handwriting with the digital pen 235 on digital paper 599, if a pressure sensor switches to ON, a dot code image on the digital paper 599 is imaged and decoded, and the paper ID of the digital paper 599 as well as position information (X and Y coordinate values) on the digital paper 599 are retrieved and stored in memory. The information stored in memory is then transmitted to the handwriting information processing system 230 via a communication circuit. Note that the above pen pressure ON information may be stored in memory as information about the pressure sensor switching ON, while the above pen pressure OFF information may be stored in memory as information about the pressure sensor switching OFF. Information about the times when the respective information was produced (year, month, day, second, fraction of second, or some combination thereof) may also be included. Additionally, the unreadable information discussed earlier may also be included.

Next, a detailed description will be given. As illustrated in FIG. 5, the digital pen 235 is equipped with a control circuit 501 that controls the behavior of the pen overall. Also, the control circuit 501 includes an image processor 501a that processes a dot code image detected from an input image, and a data processor 501b that extracts a paper ID and position information from those processing results.

In addition, a pressure sensor 502 that detects a handwriting operation by the digital pen 235 according to the pressure imparted to the pen tip 509 is connected to the control circuit 501. Also connected are an infrared LED 503 that radiates infrared light onto a sheet, and an infrared CMOS 504 that inputs an image. Additionally connected are information memory 505 for storing information such as a paper ID and position information, a communication circuit 506 for communicating with an external device, a battery 507 for driving the pen, and pen ID memory 508 that stores identification information for the pen (pen ID).

The operation of the digital pen 235 will now be summarized.

When handwriting is applied with the digital pen 235, the pressure sensor 502 connected to the pen tip 509 detects a handwriting operation. Thus, the infrared LED 503 turns on, and the infrared CMOS 504 acquires an image of the sheet with a CMOS sensor.

Note that in order to reduce power consumption, the infrared LED 503 pulses light in synchronization with the shutter timings of the CMOS sensor.

The infrared CMOS 504 also uses a global shutter CMOS sensor able to simultaneously transfer an acquired image. Also, a CMOS sensor sensitive to the infrared region is used. Also, in order to reduce the effects of disturbance, a visible light cutoff filter is disposed over the entire surface of the CMOS sensor. The CMOS sensor acquires images at a period of approximately 70 fps to 100 fps (frames per second). Note that the image sensor is not limited to a CMOS sensor, and another image sensor such as a CCD may also be used.

When an image acquired in this way is input into the control circuit 501, the control circuit 501 acquires a dot code image from the acquired image. The control circuit 501 then decodes the dot code image to acquire a paper ID and position information embedded in the dot code image.

Hereinafter, the operation of the control circuit 501 at this point will be described.

Figure 6:
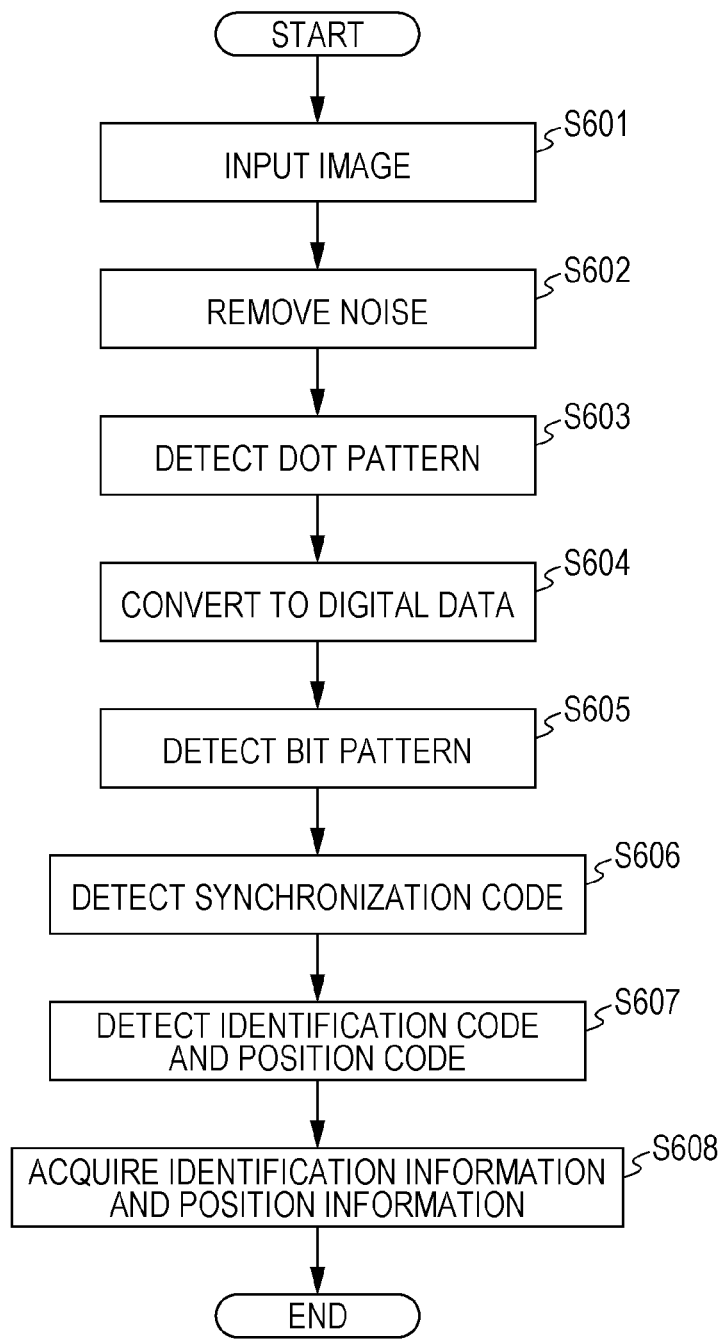
FIG. 6 is a flowchart illustrating exemplary processing by a digital pen.

FIG. 6 is a flowchart illustrating exemplary processing by the digital pen 235 (control circuit 501).

In step S601, the image processor 501a inputs an image.

In step S602, processing is conducted to remove noise included in the image. The noise at this point is noise due to CMOS sensitivity fluctuations, noise produced by electronic circuits, and the like. The question of what processing to conduct in order to remove noise is determined according to the imaging-related characteristics of the digital pen 235. For example, sharpen processes such as blur processing and unsharp masking may be applied.

In step S603, the image processor 501a detects a dot pattern (the positions of dot images) from the image. For example, the image may be separated into a dot pattern part and a background part by a binarizing process, and a dot pattern may be detected from the binarized, individual image positions. In the case where the binarized images contain many noise components, a filter process that determines a dot pattern from the area and shape of the binarized images may be used in combination.

Also, in step S604, the image processor 501a converts the detected dot pattern into a two-dimensional array of digital data. For example, the detected dot pattern is converted into a two-dimensional array in which positions with dots are "1", and positions without dots are "0". This two-dimensional array of digital data is then passed from the image processor 501a to the data processor 501b.

Subsequently, in step S605, the data processor 501b detects, from the received digital data, a bit pattern containing the combination of two dots illustrated in FIG. 7A. The bit pattern may be detected by moving the boundary position of a block corresponding to the bit pattern across the two-dimensional array, and detecting the boundary position at which two dots become contained within the block.

When a bit pattern is detected in this way, in step S606 the data processor 501b detects a synchronization code by referencing bit pattern types.

Then, in step S607, an identification code and position code are detected on the basis of their relative position from the synchronization code.

After that, in step S608 the data processor 501b decodes the identification code to acquire a paper ID, and decodes the position code to acquire position information. A paper ID is obtained by performing an RS decoding process on the identification code. Meanwhile, position information is obtained by comparing positions in a partial series read out from the position code to an M-sequence used at the time of image generation.

Next, an electronic document for handwriting information storage will be described. Hereinafter, an electronic document for handwriting information storage may be simply designated an electronic document.

An electronic document for handwriting information storage is data combining the content of handwriting applied to the digital paper 599 with the digital pen 235, together with field definitions. An electronic document includes:

(1) Paper ID: a paper ID assigned to the digital paper associated with the electronic document for handwriting information storage (2) Field definitions: field definitions used to process handwriting applied to the electronic document for handwriting information storage The following may also be included.

(3) Form image: a form image printed onto the electronic document for handwriting information storage Next, code patterns that serve as the basis for a dot code image generated in the exemplary embodiment will be described.

Figures 7A, 7B:
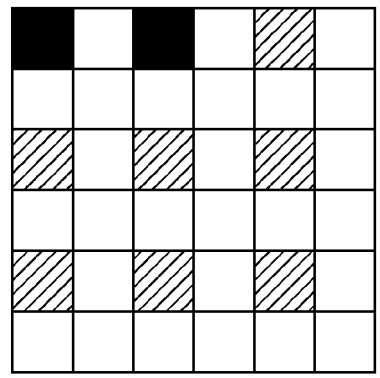
FIGS. 7A and 7B are explanatory diagrams illustrating an example of an information image (code pattern image) handled by the exemplary embodiment.

FIGS. 7A and 7B are explanatory diagrams illustrating an example of an information image (code pattern image) handled by the exemplary embodiment.

First, bit patterns constituting code patterns will be described.

FIG. 7A illustrates an example of a bit pattern layout.

A bit pattern refers to the smallest unit of information embedding. Herein, bits are disposed at two places selected from among nine places, as illustrated in FIG. 7A. In FIG. 7A, black squares represent positions where a bit is disposed, while shaded squares represent positions where a bit is not disposed. There are 36 (=9C2) combinations that select two places from among nine places. Consequently, 36 variations of information (approximately 5.2 bits) may be expressed with such a layout method.

However, assume that the paper ID and position information are expressed using 32 variations (5 bits) from among these 36 variations.

Meanwhile, the minimum square illustrated in FIG. 7A has a size of 2 dots by 2 dots at 600 dpi. Since the size of one dot at 600 dpi is 0.0423 mm, the minimum square is 84.6 μm (=0.0423 mm×2) along one edge. Since the dots constituting code patterns become more noticeable at larger sizes, smaller sizes are preferred. On the other hand, if the dots are too small, printing dots with a printer may become difficult. Thus, the above value, which is greater than 50 μm but less than 100 μm, is adopted as the dot size. In so doing, dots of optimal printable size by a printer may be formed. In other words, 84.6 μm×84.6 μm is the minimum size that may be reliably formed with a printer.

Note that by setting dots to such a size, a single bit pattern becomes approximately 0.5 mm (=0.0423 mm×2×6) along one edge.

Code patterns made up of such bit patterns will also be described.

FIG. 7B illustrates an example of a code pattern layout.

Herein, the minimum square illustrated in FIG. 7B is equivalent to the bit pattern illustrated in FIG. 7A. In other words, an identification code encoding a paper ID is embedded using 16 (=4×4) bit patterns. Also, an X position code encoding position information in the X direction and a Y position code encoding position information in the Y direction are respectively embedded using four bit patterns. Furthermore, a synchronization code for detecting the position and rotation of the code pattern is embedded using one bit pattern in the upper-left corner.

Note that the size of one code pattern is approximately 2.5 mm, being equal to the width of five bit patterns. In the exemplary embodiment, a code pattern image, which represents a code pattern generated in this way as an image, is disposed over the entire sheet surface.

FIG. 8 is an explanatory diagram illustrating an exemplary information encoding process and an exemplary information image (dot code image) generation process according to the exemplary embodiment.

First, paper ID encoding will be described.

Block-based Reed-Solomon (RS) codes are used for paper ID encoding. As described with FIGS. 7A and 7B, in the exemplary embodiment, information is embedded using bit patterns able to express 5 bits of information. Consequently, since information error is also produced in 5-bit units, RS codes which are block-based with good encoding efficiency are used. However, the encoding method is not limited to RS codes, and other encoding techniques such as BCH codes may also be used.

As discussed above, in the exemplary embodiment, bit patterns having a 5-bit information rate are used to embed information. Consequently, the RS code block length becomes 5 bits. For this reason, the paper ID is segmented into blocks with 5 bits each. In FIG. 8, a first block "00111" and a second block "01101" are cut out from a paper ID "0011101101001 . . . ".

An RS encoding process is then performed on the paper ID divided into blocks. In FIG. 8, RS encoding is conducted after dividing a paper ID into "blk1", "blk2", "blk3", "blk4", and so on.

Meanwhile, in the exemplary embodiment, a paper ID is divided into 16 (=4×4) blocks. Thus, the number of code blocks in the RS coding may be treated as 16.

The number of information blocks may also be designed according to the conditions of error production. For example, if the number of information blocks is 8, the RS code becomes a (16, 8) code. This code may be corrected even if error is produced in four blocks (=(16−8)/2) of the encoded information. Additionally, the error-correcting capability may be further improved if the position of the error may be identified. Note that in this case, although the information rate stored in the information blocks is 40 bits (=5 bits×8 blocks), of these, 32 bits are used.

Next, position information encoding will be described.

For position information encoding, M-sequence codes, a type of pseudo-random number sequence, are used. Herein, an M-sequence refers to a sequence of maximum length $2^K-1$ whose maximum period may be produced with a length-K linear shift register. Arbitrary consecutive K-bit sequences retrieved from the M-sequence have the property of not appearing at another position in the same M-sequence. Thus, position information may be encoded by using this property.

Meanwhile, in the exemplary embodiment, the order of a suitable M-sequence is computed from the length of the position information to be encoded, and an M-sequence is generated. However, in the case where the length of the position information to encode is known in advance, an M-sequence may not be generated every time. In other words, a fixed M-sequence may be generated in advance and stored in memory or the like.

For example, assume the use of an M-sequence of length 8191 (K=13).

In this case, since position information is also embedded in 5-bit units, the M-sequence of length 8191 is divided into blocks by retrieving five bits at a time. In FIG. 8, the M-sequence "11010011011010 . . . " is divided into 5-bit blocks.

In this way, in the exemplary embodiment, different encoding methods are used for the position information and the paper ID. This is also done to set the paper ID detection performance higher than the position information detection performance. In other words, since position information is information for acquiring the position on the sheet surface, even if noise or the like interferes with decoding in one portion, only that portion is defective while other portions are unaffected. In contrast, if the paper ID fails to be decoded, the sheet on which to reflect the handwriting information is no longer detected. Furthermore, by taking such a configuration, the image scanning area when decoding the position information and the paper ID may be minimized. In other words, since using an encoding method that has boundaries, such as RS codes, for the position information involves scanning codes across boundaries when decoding, the image scanning range becomes double the area of the area illustrated in FIG. 7B. However, by using an M-sequence, areas of the same size as the areas illustrated in FIG. 7B may be scanned. This is because position information may be decoded from an arbitrary partial sequence in the M-sequence, due to the properties of M-sequences. In other words, although decoding a paper ID and position information involves scanning an area of the size illustrated in FIG. 7B, the scanning position may not match the boundaries illustrated in FIG. 7B. The position information may be decoded from a partial sequence at an arbitrary position in the M-sequence. Since the same information for the paper ID is disposed over the entire sheet, even if the scanning position is shifted off the boundaries illustrated in FIG. 7B, it is still possible to restore the original information by realigning fragments of scanned information.

As above, if the paper ID is encoded with RS codes after being divided into blocks, and the position information is divided into blocks after being encoded with an M-sequence, the blocks are joined as illustrated in FIG. 8. In other words, these blocks are laid out onto a 2D plane in a format as illustrated. The format illustrated in FIG. 8 corresponds to the format illustrated in FIG. 7B. In other words, the black squares signify synchronization codes.

In addition, the numbers "1", "2", "3", and "4" disposed horizontally signify X position codes, while the numbers "1", "2", "3", and "4" disposed vertically signify Y position codes. The position codes are indicated by numerals corresponding to coordinate positions, since different information is disposed if the position on the sheet differs. Meanwhile, the squares with diagonal lines signify identification codes. The identification codes are indicated with the same marks, since the same information is disposed even if the position on the sheet differs.

Meanwhile, as FIG. 8 demonstrates, there area four bit patterns between two synchronization codes. Consequently, it is possible to dispose partial sequences from a 20-bit (=5 bits×4) M-sequence. If a 13-bit partial sequence is extracted from a 20-bit partial sequence, it is possible to the portion of the whole (8191) from which that 13-bit partial sequence comes. In this way, in the case of using 13 bits out of 20 bits for specifying the position, the remaining 7 bits may be used to error detection or correction of the extracted 13 bits. In other words, error detection and correction becomes possible by confirming 20-bit consistency using the same generation polynomial at the time of generating the M-sequence.

After that, the bit patterns in the respective blocks are converted into an image by referencing dot images. An output image expressing the information with dots is then generated, as illustrated in the rightmost part of FIG. 8.

Figure 9:
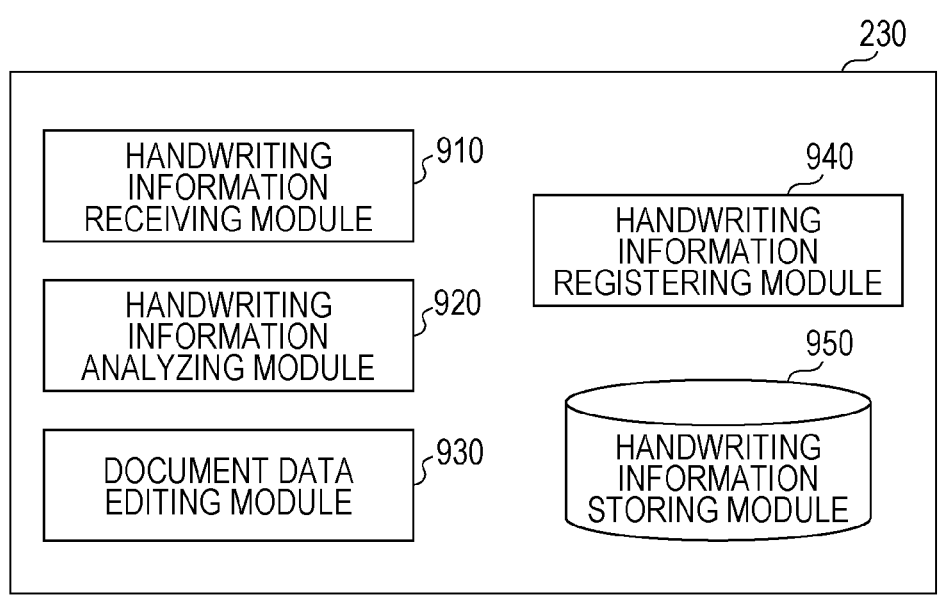
FIG. 9 is a schematic module configuration diagram illustrating a more specific exemplary configuration according to the exemplary embodiment.

FIG. 9 is a schematic module configuration diagram illustrating a more specific exemplary configuration according to the exemplary embodiment.

The handwriting information processing system 230 includes a handwriting information receiving module 910, a handwriting information analyzing module 920, a document data editing module 930, a handwriting information registering module 940, and a handwriting information storing module 950. The handwriting information processing system 230 is a system that from a digital pen 235 retrieves handwriting information written onto digital paper with the pen, and stores/manages the retrieved handwriting information. Compared to the modules illustrated by example in FIG. 1, the handwriting information receiving module 910 corresponds to the receiving module 110, the handwriting information analyzing module 920 corresponds to the detecting module 120, the document data editing module 930 corresponds to the unifying module 130, and the handwriting information registering module 940 corresponds to the outputting module 140.

In the handwriting information storing module 950, the following data is managed for each paper ID. For example, information such as document data corresponding to a sheet specified by a paper ID and handwriting information written with the digital pen 235 on the sheet specified by the paper ID may be stored. Document data is also allowed to correspond to multiple pages. Document data is made up of information such as document image data, definitions of the fields constituting the document, and text data resulting from handwritten character recognition of the handwriting belonging to each field. In the case where the document data corresponds to multiple pages, multiple pages' worth of such information exists in the document data.

FIGS. 10A to 10E are explanatory diagrams illustrating exemplary processing according to the exemplary embodiment. A process that unifies a sheet of digital paper 1010, a sheet of digital paper 1020, and a sheet of digital paper 1030 will now be described.

(1) Step 1 (FIG. 10A): Handwriting that crosses over multiple sheets is carried out.

Figure 10:
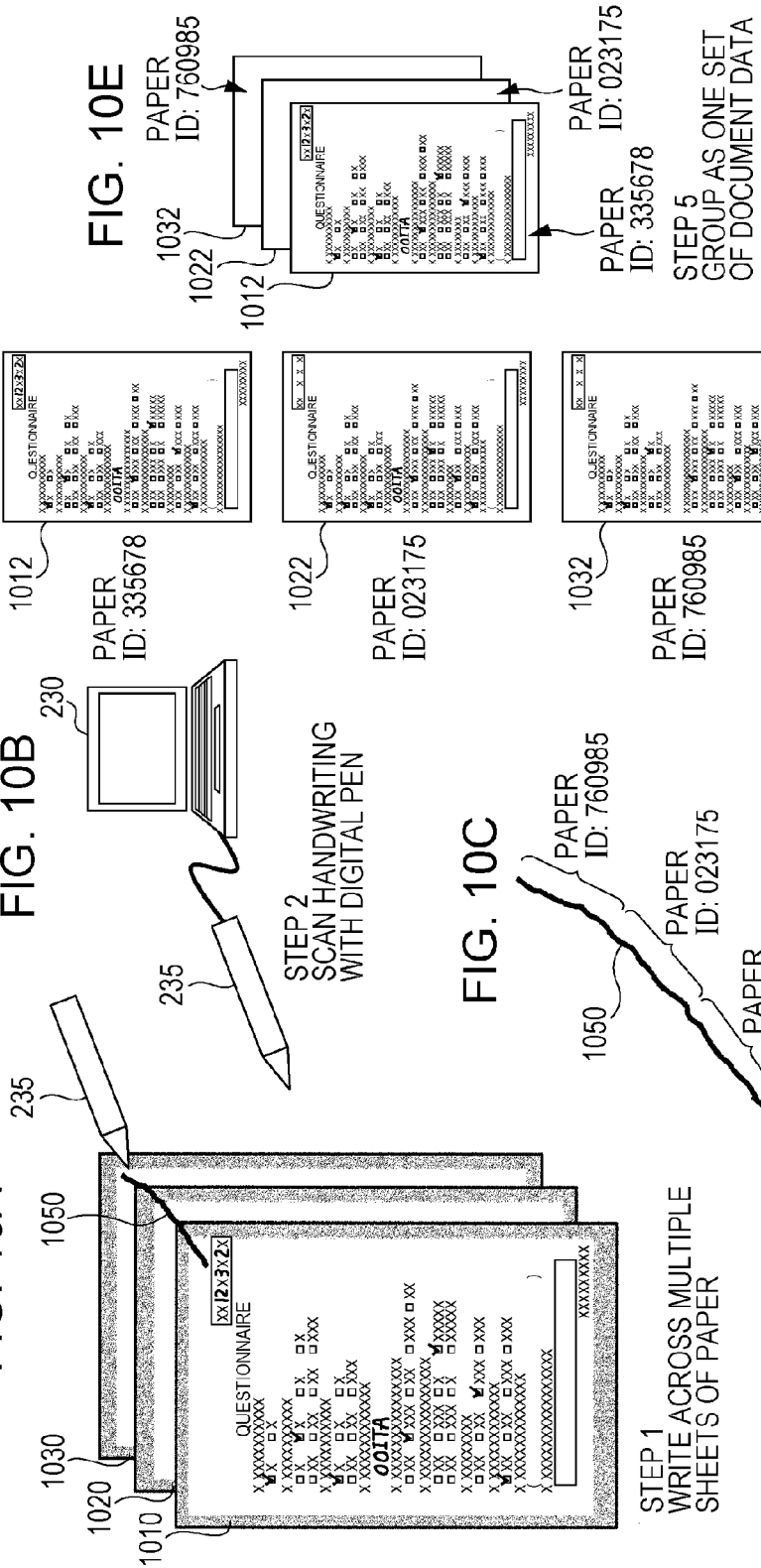
FIGS. 10A to 10E are explanatory diagrams illustrating exemplary processing according to the exemplary embodiment.

As illustrated in FIG. 10A, a user stacks the digital paper 1010, the digital paper 1020, and the digital paper 1030 such that the top of each sheet is visible. The user then uses the digital pen 235 to apply handwriting 1050 to the area in the upper-right portion of each sheet in one stroke. Herein, assume that the handwriting 1050 is conducted in the order of the digital paper 1010, the digital paper 1020, and the digital paper 1030. This operation is a unifying operation.

(2) Step 2 (FIG. 10B): Handwriting information is acquired with the digital pen.

Information regarding the handwriting 1050 is stored in memory inside the digital pen 235, and that information is then transferred to the handwriting information processing system 230.

(3) Step 3 (FIG. 10C): The paper IDs of the sheets with handwriting are collected as a list.

In the case of detecting a unifying operation from the handwriting information, the handwriting information processing system 230 retrieves multiple paper IDs included in that handwriting information. The sheets represented by these paper IDs become the sheets to be unified. Note that, as illustrated by the example in FIG. 10C, "335678" is retrieved as the paper ID in the information image printed on the digital paper 1010, "023175" is next retrieved as the paper ID in the information image printed on the digital paper 1020, and "760985" is next retrieved as the paper ID in the information image printed on the digital paper 1030.

(4) Step 4 (FIG. 10D): Document data corresponding to the paper IDs is acquired.

The handwriting information processing system 230 acquires the document data indicated by the paper IDs from a document database or the like, for example. As illustrated in FIG. 10D, document data 1012 is acquired for the paper ID "335678", document data 1022 for the paper ID "023175", and document data 1032 for the paper ID "760985". The information handwritten to each sheet is then combined with the document data.

(5) Step 5 (FIG. 10E): Unified document data is formed.

The document data 1012, the document data 1022, and the document data 1032 are unified as a sequential sheet group. For example, the data becomes usable as a document containing pages in the order of the document data 1012, the document data 1022, and the document data 1032.

Figure 11:
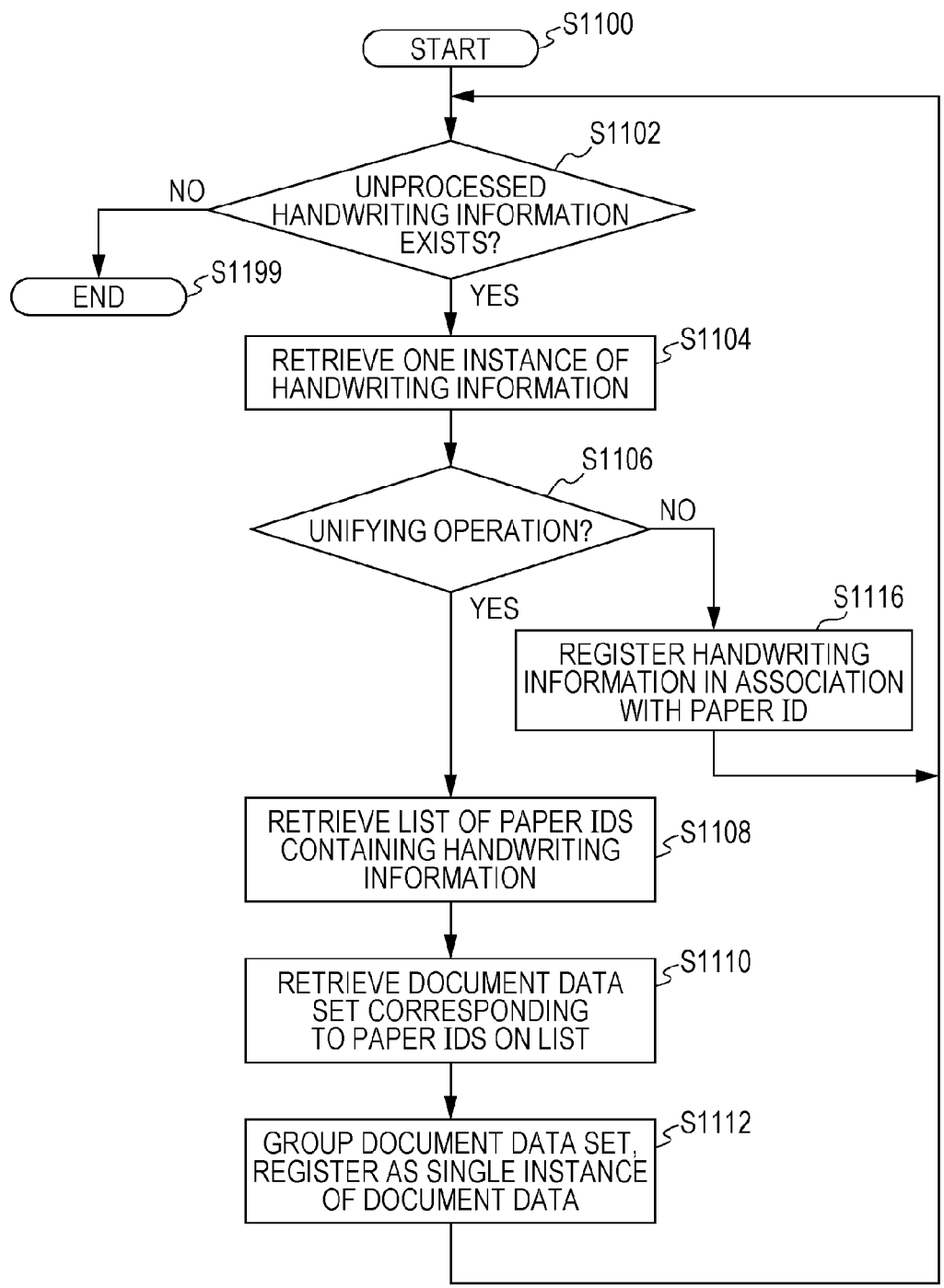
FIG. 11 is a flowchart illustrating an exemplary process according to the exemplary embodiment.

FIG. 11 is a flowchart illustrating an exemplary process according to the exemplary embodiment.

When the digital pen 235 is connected to the handwriting information processing system 230, handwriting information in the memory of the digital pen 235 is acquired by the handwriting information processing system 230 via the handwriting information receiving module 910. The handwriting information processing system 230 processes the acquired handwriting information according to the flowchart illustrated by example in FIG. 11.

In step S1102, the handwriting information receiving module 910 determines whether or not unprocessed handwriting information exists, and proceeds to step S1104 if unprocessed handwriting information exists, and otherwise ends the process (step S1199).

In step S1104, the handwriting information analyzing module 920 retrieves one instance of handwriting information.

In step S1106, the handwriting information analyzing module 920 determines whether or not the handwriting information is a unifying operation, and proceeds to step S1108 if a unifying operation, and otherwise proceeds to step S1116.

In step S1108, the document data editing module 930 retrieves a list of paper IDs included in the handwriting information.

In step S1110, the document data editing module 930 retrieves a document data set corresponding to the paper IDs included on the list.

In step S1112, the document data editing module 930 groups and registers the document data set as a single instance of document data.

In step S1116, the handwriting information registering module 940 registers the handwriting information in association with the paper IDs.

FIG. 13 is a schematic module configuration diagram for an exemplary configuration inside the digital paper printing system 220.

The digital paper printing system 220 includes a print instructions receiving module 1310, a unification instruction area specifying module 1320, a unification instruction area storing module 1330, an image generating module 1340, and a printing module 1350.

The print instructions receiving module 1310 is connected to the unification instruction area specifying module 1320. On the basis of operations performed by a user on a keyboard, mouse, touch panel, or the like, instructions are issued regarding the printing of a document with an attached information image, and the print instructions receiving module 1310 receives these instructions. The instructions may also include print instructions for a unification instruction area 1612 discussed later using the example in FIG. 16.

The unification instruction area specifying module 1320 is connected to the print instructions receiving module 1310, the unification instruction area storing module 1330, and the image generating module 1340. The unification instruction area storing module 1330 is connected to the unification instruction area specifying module 1320. In the case where print instructions for a unification instruction area 1612 is included in the print instructions received by the print instructions receiving module 1310, that unification instruction area 1612 is specified by the unification instruction area specifying module 1320. The unification instruction area 1612 may be specified as a predetermined area (such as an upper-left X coordinate and Y coordinate and a lower-right X coordinate and Y coordinate, for example), or specified on the basis of user operations performed on a keyboard, mouse, touch panel, or the like. Also, the same unification instruction area 1612 may be specified for all sheets, or a different unification instruction area 1612 may be specified for each page. Additionally, the specification results are stored by the unification instruction area storing module 1330 in association with paper IDs. For example, a unification instruction area 1400 is generated and stored by the unification instruction area storing module 1330. FIG. 14 is an explanatory diagram illustrating an exemplary data structure of a unification instruction area 1400. The unification instruction area 1400 includes a paper ID field 1410, an x1 field 1420, a y1 field 1430, an x2 field 1440, and a y2 field 1450. The paper ID field 1410 stores a paper ID. The x1 field 1420 stores the X coordinate at one corner of a unification instruction area 1612. The y1 field 1430 stores the Y coordinate at one corner of the unification instruction area 1612. The x2 field 1440 stores the X coordinate at another corner of the unification instruction area 1612. The y2 field 1450 stores the Y coordinate at another corner of the unification instruction area 1612. Note that (x1, y1) and (x2, y2) are coordinates for diagonal corners.

The image generating module 1340 is connected to the unification instruction area specifying module 1320 and the printing module 1350. The image generating module 1340 generates an information image as described using the example in FIG. 8, and conducts processing to overlay the information image onto a document image to be printed.

The printing module 1350 is connected to the image generating module 1340. The printing module 1350 causes the printer 225 to print a document image overlaid with the information image generated by the image generating module 1340.

Figure 15:
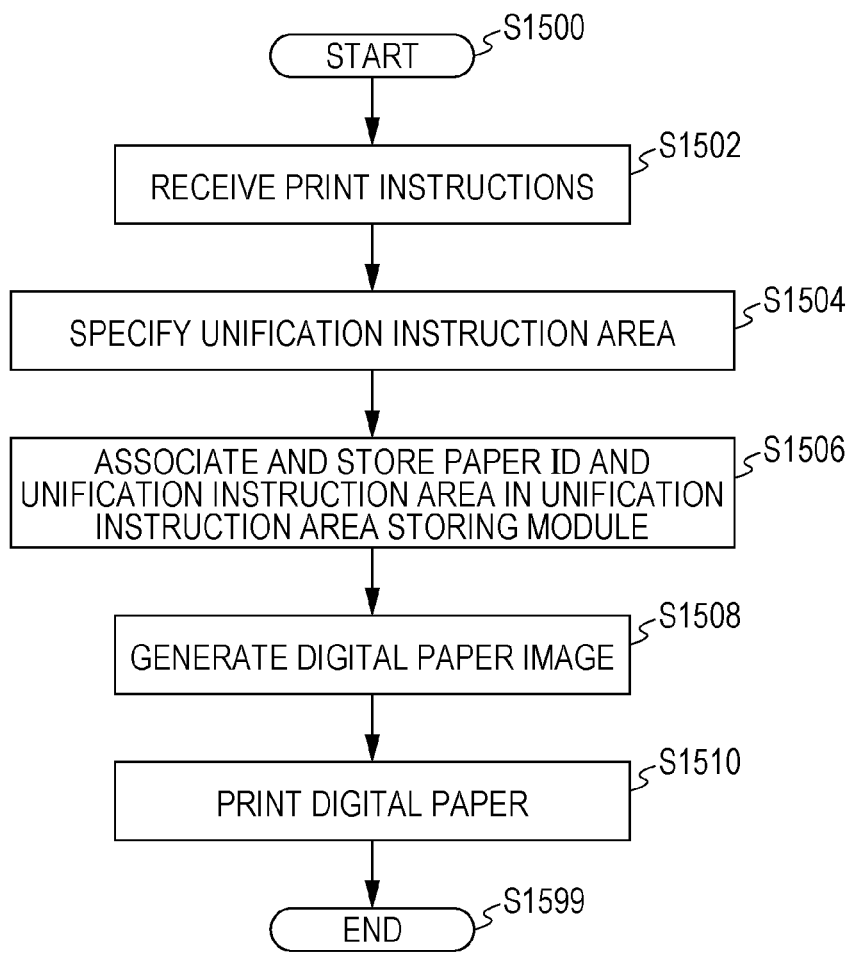
FIG. 15 is a flowchart illustrating an exemplary process according to the exemplary embodiment.

FIG. 15 is a flowchart illustrating an exemplary process according to the exemplary embodiment.

In step S1502, the print instructions receiving module 1310 receives print instructions.

In step S1504, the unification instruction area specifying module 1320 specifies a unification instruction area.

In step S1506, the unification instruction area specifying module 1320 associates and stores a paper ID and a unification instruction area in the unification instruction area storing module 1330.

In step S1508, the image generating module 1340 generates an image of a sheet of digital paper.

In step S1510, the printing module 1350 prints a sheet of digital paper.

Figure 16:
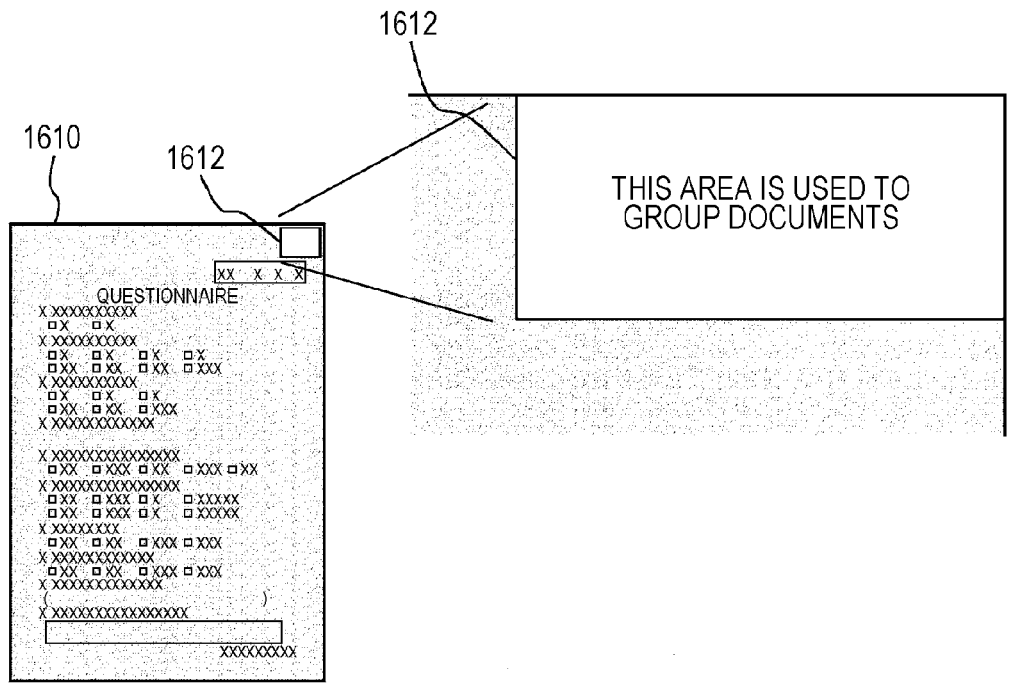
FIG. 16 is an explanatory diagram illustrating an example of digital paper.

FIG. 16 is an explanatory diagram illustrating an example of a sheet of digital paper 1610. The digital paper 1610 includes a unification instruction area 1612 in the upper-right.

If document data is simply grouped on the basis of handwriting including multiple paper IDs, there is an increased possibility of document data being grouped on the basis of incorrect handwriting, yielding a result not intended by the user.

In order to lower this possibility, it may be configured such that a unification instruction area 1612 (a field used to group documents) is provided as a special type of field in the document data, with a document data unifying process being conducted in the case where handwriting containing multiple paper IDs passes through the unification instruction area 1612 on each sheet.

Although the unification instruction area 1612 is defined in the document data, an indication may be printed on the sheet such that the user is able to ascertain where the unification instruction area 1612 is positioned on the page when applying handwriting (such as the text "THIS AREA IS USED TO GROUP DOCUMENTS" in the example in FIG. 16).

Figure 17:
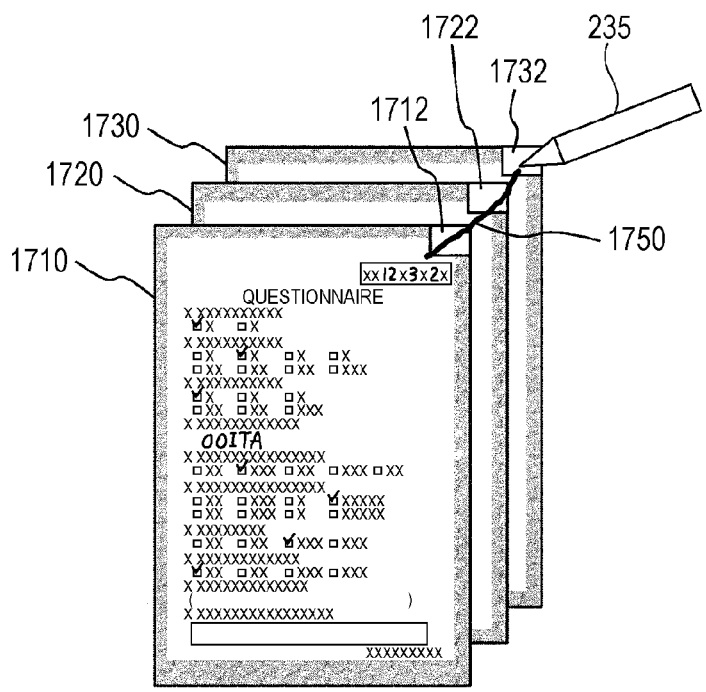
FIG. 17 is an explanatory diagrams illustrating exemplary processing according to the exemplary embodiment.

FIG. 17 is an explanatory diagram illustrating exemplary processing according to the exemplary embodiment. FIG. 17 illustrates exemplary unifying operation in the case where unification instruction areas are printed on respective sheets.

A sheet of digital paper 1710 includes a unification instruction area 1712, while a sheet of digital paper 1720 includes a unification instruction area 1722, and a sheet of digital paper 1730 includes a unification instruction area 1732. In the case where coordinates inside the unification instruction area 1712, the unification instruction area 1722, and the unification instruction area 1732 are included in a single stroke as a unifying operation, the digital paper 1710, the digital paper 1720, and the digital paper 1730 are unified as a sequential sheet group. At this point, it may also be configured such that the unification process is conducted even if coordinates other than those in the unification instruction area 1712, the unification instruction area 1722, and the unification instruction area 1732 are included in a single stroke. Conversely, it may also be configured such that the unification process is not conducted in the case where coordinates other than those in the unification instruction area 1712, the unification instruction area 1722, and the unification instruction area 1732 are included in a single stroke.

In step S1106 of the flowchart illustrated by the example in FIG. 11, the unification instruction area 1400 stored in the unification instruction area storing module 1330 is referenced, and it is determined whether or not the position information in the handwriting information is included inside the unification instruction area (inside the area of the x1 field 1420 and the y1 field 1430, and the x2 field 1440 and the y2 field 1450) corresponding to that paper ID (the paper ID field 1410).

Other processing is equivalent to the processing illustrated by the example in FIG. 11.

An exemplary hardware configuration of the digital paper printing system 220 and the handwriting information processing system 230 according to the exemplary embodiment will now be described with reference to FIG. 18. The configuration illustrated in FIG. 18 may be realized by a personal computer (PC), for example, and illustrates an exemplary hardware configuration equipped with a data reading unit 1817 such as a scanner, and a data output unit 1818 such as a printer.

The central processing unit (CPU) 1801 is a controller that executes processing according to a computer program that states execution sequences for the various modules described in the exemplary embodiment discussed in the foregoing, or in other words, for respective modules such as the receiving module 110, the detecting module 120, the unifying module 130, the outputting module 140, the print instructions receiving module 1310, the unification instruction area specifying module 1320, the image generating module 1340, and the printing module 1350.

The read-only memory (ROM) 1802 stores information such as programs and computational parameters used by the CPU 1801. The random access memory (RAM) 1803 stores information such as programs used during execution by the CPU 1801, and parameters that change as appropriate during such execution. These memory units are connected to each other by a host bus 1804 realized by a CPU bus, for example.

The host bus 1804 is connected to an external bus 1806 such as a Peripheral Component Interconnect/Interface (PCI) bus via a bridge 1805.

The keyboard 1808 and the mouse or other pointing device 1809 are input devices operated by a user. The display 1810 may be a liquid crystal display (LCD) or cathode ray tube (CRT) device, and displays various information as text and image information.

The hard disk drive (HDD) 1811 houses and drives a hard disk, causing programs executed by the CPU 1801 and information to be recorded thereto or retrieved therefrom. Information such as information images, handwriting information, the unified document table 1200, and the unification instruction area 1400 are stored in the hard disk. Additionally, various other computer programs such as various data processing programs are stored therein.

The drive 1812 reads out data or programs recorded onto a removable recording medium 1813 such as an inserted magnetic disk, optical disc, magneto-optical disc, or semiconductor memory, and supplies the data or programs to the RAM 1803 connected via the interface 1807, the external bus 1806, the bridge 1805, and the host bus 1804. The removable recording medium 1813 is usable as a data recording area similar to a hard disk.

The connection port 1814 is a port that connects to an externally connected device 1815, and has a USB, IEEE 1394, or similar receptacle. The connection port 1814 is connected to the CPU 1801 via the interface 1807 as well as the external bus 1806, the bridge 1805, and the host bus 1804. The communication unit 1816 is connected to a communication line and executes data communication processing with external equipment. The data reading unit 1817 may be a scanner, for example, and executes document scanning processing. The data output unit 1818 may be a printer, for example, and executes document data output processing.

Note that the hardware configuration of an information processing apparatus illustrated in FIG. 18 illustrates a single exemplary configuration, and that the exemplary embodiment is not limited to the configuration illustrated in FIG. 18 insofar as the configuration still enables execution of the modules described in the exemplary embodiment. For example, some modules may also be realized with special-purpose hardware (such as an application-specific integrated circuit (ASIC), for example), and some modules may be configured to reside within an external system and be connected via a communication link. Furthermore, it may also be configured such that multiple instances of the system illustrated in FIG. 18 are connected to each other by a communication link and operate in conjunction with each other. Additionally, devices such as a photocopier, fax machine, scanner, printer, or multi-function device (i.e., an image processing apparatus having two or more from among scanning, printing, copying, and faxing functions) may also be incorporated.

Note that in the processing flow illustrated in FIG. 11, the handwriting information given as a unifying operation may also be deleted after determining that the handwriting information is a unifying operation. This is because handwriting information given as a unifying operation is often information that is not suitable as handwriting information to be written into the document data. Note that the handwriting information given as a unifying operation may also be stored in association with the document data instead of being deleted.

Also, in the case where a sheet group that has already been subjected to a unifying process is additionally subjected to a unifying process (for example, several lines of handwriting for unifying operations are applied to a single sheet), it may be configured such that the second and subsequent unifying processes are not conducted.

Conversely, in the case where a sheet group that has already been subjected to a unifying process is additionally subjected to a unifying process, it may be configured such that the sheet group already subjected to a unifying processes is canceled, and a new unifying process is conducted. Specifically, cancelling a sheet group involves deleting the unified document ID in the unified document table 1200 containing the paper ID of that sheet, or alternatively, deleting just the paper ID of that sheet from the unified document table 1200, for example.

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

Potential examples of a recording medium include a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), and a Secure Digital (SD) memory card.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), an internet, an intranet, an extranet, or some combination thereof, or alternatively, by being impressed onto a carrier wave and propagated.

Furthermore, the above program may be part of another program, and may also be recorded to a recording medium together with other separate programs. The above program may also be recorded in a split manner across multiple recording media. The above program may also be recorded in a compressed, encrypted, or any other recoverable form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a receiver that receives sheet identification information included in information images printed onto sheets scanned by a scanner;
    a detector that detects whether a scanning operation by the scanner indicates that a plurality of sheets are a sequential sheet group; and
    a unifier that unifies information that corresponds to the plurality of sheets and is respectively indicated by the plurality of sheet identification information received by the receiver during the scanning operation, in response to the detector detecting an operation indicating that the plurality of sheets are a sequential sheet group,
    wherein the detector detects handwriting that crosses over multiple sheets as an operation indicating e sequential sheet group.

2. The information processing apparatus according to claim 1, wherein the receiver receives start information indicating the start of writing by the scanner, and end information indicating the end of the writing, and
    the detector detects that an operation indicating the sequential sheet group has been conducted in the case where the plurality of sheet identification information exists between the start information and the end information received by the receiver.

3. The information processing apparatus according to claim 1, wherein
    the detector detects that an operation indicating the sequential sheet group has been conducted in the case where a plurality of different sheet identification information exists within a predetermined amount of time.

4. The information processing apparatus according to claim 1, wherein
    the unifier unifies image data corresponding to the sheets indicated by the sheet identification information as the information corresponding to the plurality of sheets.

5. The information processing apparatus according to claim 4, wherein
    the image data includes at least one of document data printed onto a sheet and handwriting data handwritten onto a sheet.

6. The information processing apparatus according to claim 1, wherein
    the information images include coordinate information,
    the receiver receives the coordinate information included in the information images, and
    the detector detects that an operation indicating the sequential sheet group has been conducted in the case where coordinates indicated by the coordinate information received by the receiver are within predetermined areas of the sheets, and a plurality of different sheet identification information exists.

7. The information processing apparatus according to claim 6, wherein
    the receiver receives unreadable information indicating that the scanner was unable to scan, and
    the detector detects an operation indicating the sequential sheet group, in response to the unreadable information existing between a first instance of sheet identification information and a second instance of sheet identification information.

8. The information processing apparatus according to claim 1, wherein the handwriting that crosses over multiple sheets is a single handwriting stroke.

9. The information processing apparatus according to claim 1, wherein the scanner includes a digital pen that scans the information images that are printed on multiple sheets.

10. The information processing apparatus according to claim 9, wherein the operation indicating the sequential sheet group is handwriting input by the digital pen that crosses over multiple sheets.

11. An information processing method comprising:
    receiving sheet identification information included in information images printed onto sheets scanned by a scanner;
    detecting that a scanning operation by the scanner is an operation indicating that a plurality of sheets are a sequential sheet group; and
    upon detecting an operation indicating the sequential sheet group, unifying information corresponding to the plurality of sheets that is respectively indicated by the plurality of sheet identification information received during the scanning operation,
    wherein handwriting that crosses over multiple sheets is an operation indicating the sequential sheet group.

12. A non-transitory computer readable medium storing a program causing a computer to execute a process for processing information, the process comprising:
- receiving sheet identification information included in information images printed onto sheets scanned by a scanner;
- detecting that a scanning operation by the scanner is an operation indicating that a plurality of sheets are a sequential sheet group; and
- upon detecting an operation indicating the sequential sheet group, unifying information corresponding to the plurality of sheets that is respectively indicated by the plurality of sheet identification information received during the scanning operation,
- wherein handwriting that crosses over multiple sheets is an operation indicating the sequential sheet group.

* * * * *